United States Patent [19]
Ault et al.

[11] 4,225,831
[45] Sep. 30, 1980

[54] CW SCALABLE DONOR-ACCEPTOR GAS TRANSFER LASER

[75] Inventors: Earl R. Ault, Richland, Wash.; Mani L. Bhaumik, Malibu, Calif.

[73] Assignee: The United States of America as represented by the Secretary of the Navy, Washington, D.C.

[21] Appl. No.: 932,592

[22] Filed: Aug. 10, 1978

[51] Int. Cl.³ .............................. H01S 3/09; H01S 3/14
[52] U.S. Cl. ......................... 331/94.5 PE; 331/94.5 G
[58] Field of Search .................... 331/94.5 G, 94.5 PE

[56] References Cited

U.S. PATENT DOCUMENTS

| | | | |
|---|---|---|---|
| 3,970,964 | 7/1976 | Olson et al. | 331/94.5 G |
| 4,053,852 | 10/1977 | Krupke | 331/94.5 G |

OTHER PUBLICATIONS

J. B. Laudenslager et al., "Electric-discharge-pumped nitrogen ion laser*", *Applied Physics Letters*, vol. 29, No. 9, Nov. 1976, pp. 580-582.

C. B. Collins et al., "A nitrogen ion laser pumped by charge transfer*", *Applied Physics Letters*, vol. 25, No. 6, Sep. 15, 1974, pp. 344-345.

*Primary Examiner*—James W. Davie
*Attorney, Agent, or Firm*—Richard S. Sciascia; Thomas M. Phillips

[57] ABSTRACT

A donor gas, such as helium or argon, is pumped into a receiving end of a chamber formed with widely-diverging walls providing an expanded area at its delivery end. Electrodes mounted in the receiving end produce a potential capable of exciting the admitted gas into $He_2{}^+$ or argon metastables. An arc discharge is produced for the helium and a glow discharge for the argon. The excited donor then flows through the chamber to a diffusion mixer formed by an array of nozzles covering its expanded delivery end area where it continually mixes with an acceptor gas, such as $N_2$, supplied through the nozzles. Mixing results in an electronic excitation energy transfer reaction in which the charge from the excited donor is transferred to the acceptor. An optical resonant cavity communicating with the nozzle array receives the excited acceptor and population inversion in the cavity generates a laser beam. With nitrogen, the emission is a continuous wave in the UV-visible region.

10 Claims, 3 Drawing Figures

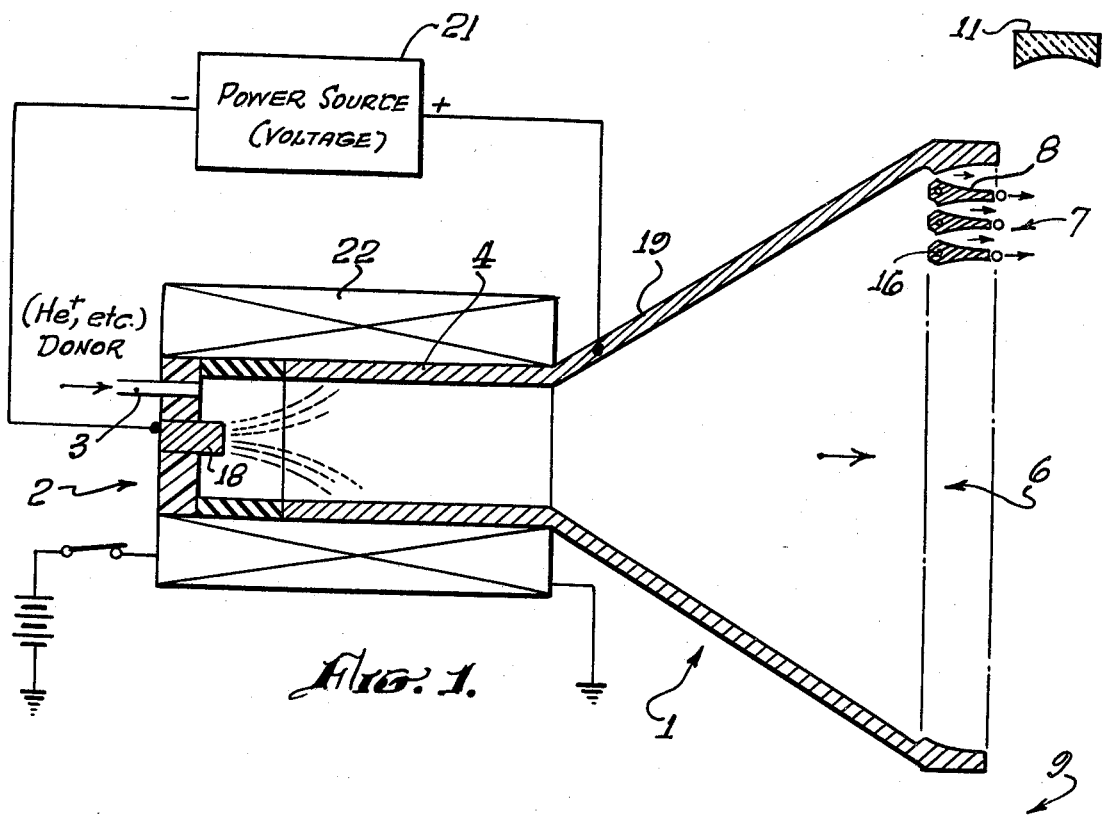
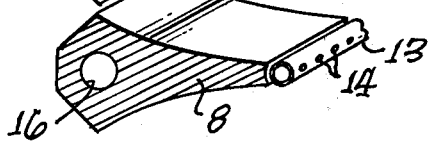
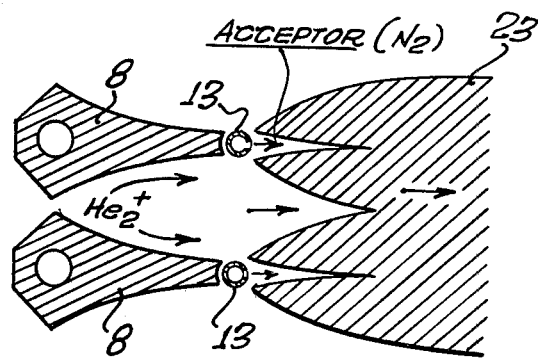

CW SCALABLE DONOR-ACCEPTOR GAS TRANSFER LASER

BACKGROUND OF THE INVENTION

The invention relates to laser beam generation and, in particular, to the excitation of a laser gas by an electronic energy charge transfer derived from an excited donor gas.

A principal object of the invention is to provide a continuous-wave (CW), scalable, short wavelength (UV-visible) efficient gas laser. Electronic charge transfer from a noble gas donor to a lasing gas acceptor is employed to excite the laser gas. CW operation is achieved by continuously flowing the noble donor gas through an electical field before mixing it with a continuous supply of acceptor gas, the electrical field energizing the donor to a charge-transferable state.

The efficacy of electron charge transfers from noble gas donors to acceptor gases is an established fact and UV-visible lasers utilizing the present transfer mechanisms have been demonstrated. For example, a paper entitled "A Nitrogen Ion Laser Pumped by Charge Transfer" authored by C. B. Collins, A. V. Cunningham and M. Stockton has been published in Applied Physics Letters, Vol 25, number 6, page 344, Sept. 15, 1974. The charge transfer of this reference is from a donor gas, $He_2^+$. Also, U.S. Pat. No. 3,970,964, July 20, 1976, N. Thomas Olson, Earl R. Ault and Mani L. Bhaumik, "High Power Argon/Nitrogen Transfer Laser" describes a laser exhibiting an output wavelength at 3577 Å. Argon is the preferred donor gas although others are suggested. Transfer lasers such as these He/N and Ar/N examples, represent significant advances. For one reason, they provide laser beam sources in the UV-visible region and such sources have a number of important applications in fields of isotope separation, underwater communication, etc. Earlier work presented difficulties particularly involving a need for high pressures and a resulting low electron temperature which was unable to effectively excite the upper laser level of the gas in UV-visible lasers.

Although these prior transfer lasers are of considerable interest, it is to be noted that they both are pumped by pulsed E-beams or, in other words, they both are pulsed rather than CW lasers. Pulsed lasers, of course, are rather common and, for many applications, they are entirely acceptable. The continuous wave mode, however, considerably extends the use potential and provides some real advantages well recognized in the art. Further, the E-beam excitation or pumping of these pulsed lasers itself imposes limits on scalability or the potential for power increases. One limit, for example, is imposed by the so-called magnetic 'pinching ' effect occuring at certain high E-beam levels. As will become apparent, the present CW laser is not so restricted. Instead, because of its mode of operation and its structural arrangement, scalability becomes relatively unlimited.

BRIEF DESCRIPTION OF THE DRAWINGS

The invention is illustrated in the accompanying drawings of which:

FIG. 1 is a schematic view illustrating the general arrangement of the component parts of the laser;

FIG. 2 is a perspective showing a section of a particular nozzle array, and

FIG. 3 is another schematic illustrating the diffusion mixing produced by the nozzle array.

DETAILED DESCRIPTION OF THE INVENTION

Referring to FIG. 1, the present laser essentially is formed of a chamber 1 having a receiving end 2 fitted with a conduit 3 through which a donor gas is continuously pumped into the interior of the chamber. As shown, a length 4 of the receiving end region is of a reduced size or cross sectional area and, at the end of length 4, the chamber walls diverge or expand outwardly in the direction of a so-called delivery end 6. An array 7 of individual nozzles 8 completely covers the expanded area of the chamber at its delivery end with the individual nozzles being spaced one from another a slight distance sufficient to permit the donor gas to pass into the mixing area. After mixing, the excited acceptor gas flows into an optical resonant cavity 9 represented in FIG. 1 by conventional reflectors 11 and 12. Reflector 11, for example, is a total reflector while reflector 12 is a partial one. Preferably, the chamber 1 is rectilinear in cross-section to accomodate a relatively long optical cavity configuration.

Nozzles 7 mutually accomplish the desired diffusion mixing of the admitted donor gas with an acceptor gas which, of course, is the lasing gas supplied to the optical resonant cavity in which it achieves a population inversion and produces the desired laser beam. For mixing purposes, each nozzle is fitted with a tube 13 formed with a plurality of apertures 14 (FIG. 2) through which the acceptor gas is pumped for intimate diffusion mixing with the flowing donor gas. For cooling purposes, the nozzles are also formed with cooling passages 16.

In one embodiment of the invention the donor gas admitted through conduit 3 is a helium gas ($He^+$) and the acceptor gas is nitrogen ($N_2$). For charge transfer purposes, it is essential to convert or excite the admitted $He^+$ into molecular $He_2^+$ which, in its excited form, rapidly flows to the delivery end where it is mixed with $N_2$ to complete the charge transfer reaction essential for lasing purposes. Specifically, the transfer reaction is:
$He_2^+ + N_2 \rightarrow He + N_2^+$.

One of the features of the present invention is the finding that the helium donor gas can be excited into molecular $He_2^+$ in a high pressure arc discharge similar in a number of respects to the arc discharge of a heliarc welder. Further, it has been found that the molecular helium ions can be produced in the discharge efficiently even with low average electron temperature and that they can remain as the molecular ion for a relatively long period of time due to their extremely low recombination coefficient. Consequently, the $He_2^+$ ions can be transported through the chamber for a considerable distance without loss of the ions in the flowing arc jet. Pressures for the conversion are near atmospheric and, at these pressures, the admitted donor quickly converts into the molecular ion.

To achieve the required arc discharge, a pair of electrodes 18 and 19 are mounted in chamber 1, electrode 18 being mounted in the receiving end of the chamber and electrode 19 being provided, if desired, by the chamber wall. A high voltage potential is applied across these electrodes from a power source 21 and, as will be understood, the voltage and pressure parameters are adjusted to assure the establishment of the desired arc. As has been stated, the arrangement is somewhat similar to the heliarc welder with a potential of about 300 volts across its electrodes. Thus, the power required to convert or excite the admitted helium gas is, in effect, a high current relatively low voltage source, i.e. low as compared with the previous charge E-beam transfers which require much higher voltages. In the arc, the helium quickly converts to its molecular ionic form for delivery to the diffusion mixer. A solenoid 22 or the like can be used to drive the ions towards the mixer at a relatively rapid rate. Although the molecular helium ions are relatively stable, high speed flow minimizes the possibility of recombination. Further, as will be appreciated, the greater the flow speed and the mixing rate of the gases, the more power will be generated.

The charge transfer reaction comes to completion in the diffusion mixing in a manner similar to the mixing in the case of a $H_2+F_2$ chemical laser. FIG. 3 schematically illustrates the manner in which the two gases mix. As shown, the mixed gases are those within the hatched envelope 23.

It previously has been noted that, using a pulsed relatavistic electron beam, Collins, et al have demonstrated that efficient charge transfer takes place from $He_2^+$ to $N_2$ forming excited states of $N_2^+$ followed by efficient laser emission in the blue-green region from $N_2^+$. The nature of this reaction is described in this reference and also in an earlier reference "The Nitrogen Ion Laser" by C. B. Collins and A. V. Cunningham, Special Technical Report, UTDP-ML-01 of August 1974. These references fully support the efficiency of the transfer. Even so, it is to be noted that the high density required by its relatavistic E-beam cannot be obtained in a CW mode. In contrast, the present laser, using the helium arc jet, indeed can supply the necessary $He_2^+$ ion density continuously and, in fact, it can do so even with the use of atmospheric $N_2$. It is true that the efficiency achieved in a laser utilizing atmospheric $N_2$ may be somewhat limited due to a competing charge transfer from $He_2^+$ to atmospheric $O_2$ or other impurities although the relative rates nevertheless favor the transfer to $N_2$. If desired, pure $N_2$ gas instead of the atmospheric $N_2$ may be mixed with the $He_2^+$ ion jet and the detrimental effect of the atmospheric $O_2$ or other constituents thus eliminated.

Using the same apparatus as has already been described with regard to the helium embodiment, a second embodiment of the invention is provided using, as before, the nitrogen as the acceptor but argon rather than helium as the donor. In this embodiment, the excited metastable levels of the noble gas argon store the excitation energy which subsequently is transferred to an $N_2$ laser molecule in the fast flowing mixing scheme. The reaction of the argon metastables in imparting their stored energy to the $N_2$ molecules has, as previously noted, been described in the Olson, et al Patent disclosure and, as there noted, an efficient laser in the UV-visible region is achieved. Again, however, the disclosure of this patent reference involves a high density relativistic E-beam and CW operation cannot be achieved. In the present embodiment, CW operation is achieved by controlling the pressure of the argon in the chamber and also by utilizing a glow discharge produced by electrodes 18 and 19. Specifically, the pressure of the argon in chamber 11 should be low enough to prevent the formation of argon excimers since, as is known, such excimers will reduce the available excitation energy. On the other hand, the argon pressure should be high enough to accomplish the formation of argon metastables via the formation of the argon molecular ion and subsequent dissociative recombination. Argon pressures of 3–4 Torr are suitable. The establishment of the glow discharge rather than an arc discharge can be established in manners well known in the art.

In summary, the present invention provides a continuous wave nitrogen laser operating on a charge transfer principle from a noble gas such as helium or argon. While these particular noble gases are preferred and their charge transfer mechanisms have been demonstrated, it also should be recognized that the principles of the invention apply equally to other noble gases (from helium through Xenon) and it also is contemplated that other acceptor gases may be employed. The principle of the invention is concerned more with the concept of initially exciting the donor gas in an electric field established between a pair of electrodes or the like and then flowing the gas through a chamber to an array of mixing nozzles 8. Such a principle clearly can be applied to any donor gas capable of being excited within such a field and also capable of maintaining its excited state during the flow time required for passage through the chamber to the nozzles. Another distinct advantage of the present arrangement is its potential for scalability. In other words, the size and power of the laser itself can be substantially increased by increasing the size of the nozzle array and, consequently, increasing the mixing capacity and the number of excited nitrogen ions delivered into the resonant cavity of the laser. Also, the laser power can be increased by maximizing the flow rate to again increase the number of nitrogen ions delivered to the cavity.

Obviously many modifications and variations of the present invention are possible in the light of the above teachings. It is therefore to be understood that within the scope of the appended claims the invention may be practiced otherwise than as specifically described.

We claim:

1. A method of promoting an electronic energy charge transfer between a noble gas donor selected from a group consisting of helium and argon and a nitrogen lasing gas acceptor comprising:
   admitting a continuous-flowing supply of said noble gas into a constricted receiving end of a chamber having widely-diverging walls terminating in an expanded mixing region end,
   subjecting said noble gas supply in said constricted end to a continuously-applied electric-discharge having an electric potential of sufficient magnitude to convertably excite the noble gas into an energy-transferable state,
   expandably delivering said excited gas to said mixing region end,
   diffusion-mixing said delivered gas with a continuous supply of said nitrogen lasing gas for transferably exciting said nitrogen gas into a laseable state, and
   delivering said excited nitrogen gas into an optical resonant cavity for generating a laser beam.

2. The method of claim 1 wherein said noble gas is helium ($He^+$) and said $He^+$ initially is convertably excited into molecular $He_2^+$ by producing an arc discharge in the $He^+$ supply,
   said diffusion mixing producing an electronic energy transfer reaction resulting in the formation of a laseable $N^+$ gas.

3. The method of claim 2 wherein said arc discharge excitation is achieved at a pressure near atmospheric.

4. The method of claim 3 wherein said nitrogen supply is a pure non-atmospheric nitrogen.

5. The method of claim 1 wherein said noble gas is argon and said argon is convertably excited into argon metastables by producing a glow discharge in said argon supply,
   said argon excitation being accomplished in a pressure environment sufficiently low to minimize the formation of argon excimers and sufficiently high to maximize the formation of the argon metastables.

6. The method of claim 5 wherein said pressure environment is about 3-4 Torr.

7. Apparatus for promoting an electronic energy charge transfer between a noble gas donor and a nitrogen lasing gas acceptor comprising:
   a supply of said noble gas,
   a supply of said nitrogen gas,
   a chamber having diverging walls providing a constricted receiving end and an expanded delivery end,
   means for admitting said noble gas into said receiving end,
   electric potential means mounted in said recieving end for exciting said noble gas supply into an energy-transferable state,
   means for producing a rapid flow of said excited gas through said chamber to its delivery end,
   an array of nozzles disposed in a closely-spaced arrangement across substantially the full extent of said delivery end,
   means coupling said nitrogen gas supply to the nozzles for diffusably mixing said nitrogen gas with said rapidly-flowing excited noble gas for transferably exciting said nitrogen into a laseable state, and
   an optical resonant cavity disposed adjacent said nozzle array, said excited lasing gas being delivered into said cavity for laser beam generation.

8. The apparatus of claim 7 wherein said donor gas is selected from a group consisting of helium and argon.

9. The apparatus of claim 7 wherein said donor gas is helium,
   said means for exciting said helium including:
   a pair of electrodes positioned at said receiving end region of said chamber, and
   a power source for providing a potential across said electrodes sufficient to produce a helium-arc discharge therebetween capable of converting said helium into a molecular $He_2^+$ form.

10. The apparatus of claim 7 wherein said donor gas is argon,
    said means for exciting said argon including:
    a pair of electrodes positioned at said receiving end region of said chamber, and
    a power source for providing a potential across said electrodes sufficient to produce a glow discharge capable of converting said admitted argon into argon metastables.

* * * * *